United States Patent
Fisher et al.

(10) Patent No.: US 11,831,748 B1
(45) Date of Patent: Nov. 28, 2023

(54) METHOD AND SYSTEM FOR UTILIZING THE INFRASTRUCTURE OF A BLOCKCHAIN TO ENHANCE THE DEGREE OF SECURITY AND VERACITY OF ANOTHER BLOCKCHAIN

(71) Applicants: Justin Fisher, Del Ray, FL (US); Maxwell Sanchez, Albuquerque, NM (US)

(72) Inventors: Justin Fisher, Del Ray, FL (US); Maxwell Sanchez, Albuquerque, NM (US)

( * ) Notice: Subject to any disclaimer, the term of this patent is extended or adjusted under 35 U.S.C. 154(b) by 355 days.

(21) Appl. No.: 15/407,810

(22) Filed: Jan. 17, 2017

(51) Int. Cl.
| | |
|---|---|
| H04L 9/06 | (2006.01) |
| G06Q 20/38 | (2012.01) |
| H04L 9/32 | (2006.01) |
| G06Q 20/06 | (2012.01) |

(52) U.S. Cl.
CPC ......... *H04L 9/0637* (2013.01); *G06Q 20/389* (2013.01); *H04L 9/3247* (2013.01); *G06Q 20/065* (2013.01)

(58) Field of Classification Search
CPC ... H04L 9/0637; H04L 9/3247; G06Q 20/389; G06Q 20/065
USPC .......................................................... 705/64
See application file for complete search history.

(56) References Cited

U.S. PATENT DOCUMENTS 9,875,510 B1 * 1/2018 Kasper ................... G06Q 40/12
9,892,460 B1 * 2/2018 Winklevoss ........... G06Q 40/04
2015/0170112 A1 * 6/2015 DeCastro ............. G06Q 20/381 705/39
2016/0027229 A1 * 1/2016 Spanos ................. G07C 13/00 705/51
2016/0028552 A1 * 1/2016 Spanos ................. H04L 9/3268 713/178
2016/0098730 A1 * 4/2016 Feeney ............. G06Q 20/3825 705/71
2016/0260171 A1 * 9/2016 Ford ...................... G06Q 40/04
2016/0292680 A1 * 10/2016 Wilson, Jr. ............. G06Q 40/06
2016/0330034 A1 * 11/2016 Back .................... G06Q 20/065
2019/0236716 A1 * 8/2019 Kasper .................. H04L 63/123

FOREIGN PATENT DOCUMENTS

WO WO-2018069566 A1 * 4/2018 ............. G06F 21/34
WO WO-2018104276 A1 * 6/2018 ........... H04L 9/3236

OTHER PUBLICATIONS

WO 2018/104276 A1 Published on Jun. 14, 2018, translation by IP.com (Year: 2018).*
Jovanovic "ByzCoin: Securely Scaling Blockchains", retrieved from https://hackingdistributed.com/2016/08/04/byzcoin/, Aug. 4, 2016, 13 pages (Year: 2016).*
English translation of Komarov et al. WO 2018/104276 A1 claiming priority to German application 10 2016 224 537.6 filed Dec. 8, 2016, 16 pages (Year: 2016).*

* cited by examiner

Primary Examiner — James D Nigh
(74) Attorney, Agent, or Firm — Rimon PC; Marc S. Kaufman

(57) ABSTRACT

The invention is a system and method for improving the reliability of data on blockchain by proofing the data onto another blockchain by use of nonfederated nodes. Contemplated within the scope of the invention is resolution process for data forks within a blockchain network.

18 Claims, 7 Drawing Sheets

METHOD AND SYSTEM FOR UTILIZING THE INFRASTRUCTURE OF A BLOCKCHAIN TO ENHANCE THE DEGREE OF SECURITY AND VERACITY OF ANOTHER BLOCKCHAIN

CROSS REFERENCE TO RELATED APPLICATIONS

If the selection is available to this type of application, then this application is a Continuation-in-Part patent application that claims priority to U.S. Nonprovisional application Ser. No. 15/083,238 filed Mar. 18, 2016 which claims the benefit of U.S. Provisional Application No. 62/139,655 filed Mar. 28, 2015. If the selection is available to this type of application, then this application claims priority to U.S. Nonprovisional application Ser. No. 15/083,238 filed Mar. 18, 2016 and also U.S. Provisional Application No. 62/336,661 filed May 15, 2016. If available to this type of application, then all prior applications cited above are incorporated herein by this reference for all purposes.

TECHNICAL FIELD

The present disclosure relates to both methods and systems for enhancing the degree of security and veracity of the data of one blockchain by utilizing the infrastructure and consensus protocol of another blockchain.

BACKGROUND

The Basics of Blockchain

Blockchain technology uses the blockchain, otherwise known as a distributed ledger, a public ledger, a transaction database, and or by other terms, to create a publicly verifiable record of digital transactions. These transactions in a blockchain network may include cryptocurrency or token transactions such as Bitcoin, Litecoin, Namecoin, Ethereum, or other digital transactions of both financial and non-financial natures.

In a typical blockchain, each block contains units of information commonly called transactions. Each block is thus a grouping of transactions, which, when considered in their entirety, represent a single atomic modification to a state machine. An entire block is accepted or rejected, as a block itself is the smallest practical unit of consensus on most blockchains. In most blockchain networks, physical computer processing devices known as nodes are directed to store the blockchain in its entirety, or a smaller version of the blockchain with a summation of older data (this smaller version is known as a pruned blockchain). Physical computer processors configured by machine-readable instructions to receive, validate, and store most or all of a blockchain network's transactions are termed "full nodes." The degree of "security" of a blockchain network is a measure of the immutability of the transactions recorded on it. "Security" is a function of the total resource expenditure of its miners. Great resource expenditure required in the blockchain's mining protocol correlates with high security. It is unlikely that the entire network can be corrupted in a highly secure proof-of-work blockchain network since modifying data upon which the network has already reached consensus requires the employment of extensive computational power, Because of such decentralization of significant computational power used for mining in some blockchains, those blockchains are considered a way to have an immutable record of transactions. To illustrate this concept. Bitcoin's blockchain may be considered a state machine in that every node can maintain an identical copy of the blockchain at any point in "time," where "time" is measured by the height of the last considered blockchain block. Every full node is enabled to freely share all the block and transaction data it has with the rest of the network. Because of this redundancy in the network of the record of transactions and the difficulty of its mining protocol, portions (or blocks) of the Bitcoin blockchain which have been "confirmed" or accepted are considered immutable, the immutability of each portion being quantifiable by, in the case of Bitcoin, the computational resource expenditure required to overwrite the portion.

The process of blockchain mining provides a consensus mechanism designed to allow the network of nodes to agree on the blockchain's correct state. Any number of nodes adhering to the same consensus rules will, when enabled to exchange information, come to the same deterministic consensus by processing all data available and arriving at the same conclusion regarding the legitimacy or illegitimacy of individual network blocks or other units of consensus. A physical computer processor configured by machine-readable instructions to produce the element of a block which enables the entirety of the network to validate it is a type of "miner." Several consensus protocols use miners to propose a new block. In blockchains that utilize the Proof-of-Work ("PoW") mining protocol, for example, miners produce solutions to a difficult problem, and in doing so, create a block which the rest of the network validates. All other nodes in the network employing the Proof-of-Work protocol are configured to verify the new block proposed by the miner before the new block is added to the distributed ledger. As an example of how mining may be incentivized or gamified, the Bitcoin blockchain utilizes a Proof-of-Work protocol, in which a miner is entitled to all of the transaction fees of all the transactions that the miner includes in the block that it creates, in additional to a number of native tokens created by the block mintage process.

Blockchains on a distributed network of devices with sufficiently restrictive rules of block validation and consensus (namely, the ability to deterministically decide which blocks comprise the best blockchain) are fairly secure against unauthorized changes to the data stored within them. This is why blockchains may be particularly useful for recording financial transactions. A critical limitation, however, is that the bandwidth and storage requirements of a full node grow with the number of transactions on the blockchain network. Well-known credit card transaction infrastructure (which does not yet operate on a blockchain network) processes about 2,000 transactions per second (TPS). These transactions could not run on the Bitcoin blockchain, which is limited to running approximately 7 TPS, or about 144 MB of data per day. An entity that processes thousands of transactions per second on a blockchain would have to save about 41 GB of data per day if they used software similar to the Bitcoin network's software; such an increase in data storage and bandwidth requirements would drastically increase the physical size, density, and energy expenditure of a full node on that network. Due to the associated costs and maintenance, far fewer entities would be willing and able to deploy and maintain a full node. This shrinking of the pool of entities running full nodes would drastically increase the centralization of the blockchain network, diminishing the network's decentralization, though decentralization is the property that gives the hallmark benefits of using blockchains as distributed ledgers.

In a blockchain network, when two blocks are found that both reference a previous block as the parent, a "fork" in the chain is created. Existing fork resolution protocols on Proof-of-Work blockchains favor the addition of the highest cumulative mining difficulty chain in the fork; the longest/heaviest chain is accepted by consensus as the valid chain, Therefore, any entity that attempts to change a block must not only re-perform the mining process to generate a valid mining solution for each subsequent block after the one they wish to overwrite, but must also do it faster than every other miner combined working on the currently accepted chain. After a certain number of blocks have been chained to a particular block, a great cost in energy must be expended to change that block.

The Unmet Needs and Prior Attempts at Solutions

One of the largest issues facing blockchains today their ability to reach and maintain consensus over blockchain data has sparked a variety of debates over the complexity and security of a broad selection of upcoming technologies.

The proof-of-work protocol used by Bitcoin has met two primary criticisms: (1) wasteful electricity consumption, and (2) weak on small chains. The criticism regarding inefficiency in consuming electricity stands on unsolid footing so too could a lightbulb be similarly called an inefficient conductor. It is true, however, that smaller cryptocurrencies implementing proof-of-work are vulnerable to relatively low-cost attacks, especially when a larger chain utilizing the same hashing algorithm exists.

In answer to these criticisms, a variety of alternative consensus mechanisms have been proposed and developed, including proof-of-stake ("PoS") where users hold balances in native currency to mine, practical byzantine fault tolerance and the Ripple protocol consensus algorithm which adapt the ideas behind classical consensus algorithms like RAFT and Paxos to function on large-scale, trustless systems, and federated nodes or trusted nodes which act as network authorities and are trusted to resolve consensus conflicts.

Each of these consensus algorithms, however, trade off some of the advantages of a proof-of-work consensus mechanism, advantages such as thermodynamically-sound security expectations, trustless and permissionless involvement of miners, mathematically-verifiable replaying of network history for new nodes ("strong subjectivity"), significant opportunity costs to attack, etc. An overview of these previous technologies and their limitations follow.

Several blockchain network developers have adopted merge mining and the AuxPoW protocol, which allowed Bitcoin miners to simultaneously mine both Bitcoin and one or more auxiliary blockchains (similarly, merge mining can be employed to mine alongside PoW blockchains other than Bitcoin). Some blockchain network developers launched protocols which ran on top of Bitcoin by embedding their blockchain in the Bitcoin blockchain.

Merged mining enables the miner of one parent blockchain to simultaneously mine on one or more auxiliary blockchains. The parent blockchain itself requires no modification to allow other blockchains to merge-mine using AuxPoW. To merge mine, a miner must first build valid block(s) for the auxiliary blockchain(s), and then include some proof of these blocks in the parent blockchain which they attempt to mine (often by embedding the auxiliary blockchain block hash in the parent block coinbase transaction). If a miner successfully solves the proof-of-work below a target that satisfies one or more of the merge-mined or parent blockchains, the corresponding block(s) and the proof-of-work solution are combined and relayed to their respective blockchain(s).

Merge-mining requires the active participation of parent blockchain miners, and the percentage of the hash-rate which the auxiliary blockchain inherits is the percentage of the parent blockchain's hashing power which is performing merge-mining for the particular auxiliary blockchain.

Merge-mining does not scale effectively to secure many auxiliary blockchains, because it would require that parent blockchain miners track and assemble blocks for a large quantity of auxiliary blockchains. It also forces the auxiliary blockchains to use the same hashing algorithm as the parent blockchain. Finally, in some implementations, the opportunity cost for parent blockchain miners to attack the auxiliary blockchain is only the cost of not merge-mining the auxiliary blockchain legitimately, as the miner can continue to mine the parent blockchain (and merge-mine other blockchains) honestly while attempting an attack on another auxiliary network.

Blockchains or pseudo-blockchains inherit the security of highly-secure blockchains by writing the entirety or near-entirety of their blockchain within another blockchain. These technologies are called layered technologies. "Enhanced" or "aware" clients for these technologies act as nodes on the parent blockchain network, and look for embedded data which has special meaning to their blockchain. These data are then interpreted under their own rules to perform manipulations of the secondary or embedded blockchain's state machine.

Reorganizations in the parent blockchain result in reorganizations on the secondary/embedded blockchain. Generally, a transaction on the parent blockchain is created whenever a transaction on the secondary/embedded blockchain is created. This transactional data or a representation (hash) thereof is embedded into the parent blockchain transaction using a variety of means including OP_RETURN and "impossible" addresses which embed data and don't have a known corresponding public/private keypair.

Embedding a secondary blockchain within a parent blockchain imposes significant limitations on the secondary blockchain including block-time limitation, minimal storage capacity, and for the sake of efficiency often requires the secondary blockchain to utilize the address format of the parent blockchain. Users of the secondary blockchain must also own and spend token on the parent blockchain to transact on the secondary blockchain. Finally, these technologies have significant difficulty scaling beyond the transactional volume supported by the parent blockchain. While technologies like Colored Coins store and transmit transaction "attachments" on a torrent network, each unique transaction on those blockchain networks requires a transaction to be broadcast on Bitcoin as well.

Existing technologies for recycling the proof-of-work security of one parent blockchain onto auxiliary/secondary blockchains comes with significant drawbacks regarding the level of security, the limitations imposed on the auxiliary/secondary blockchains, and scalability concerns.

Notwithstanding the advancements made in the prior art in the field of blockchain security and efficiency, there remains a need for a devices and methods that improve the security of networks that do not have a highly protocol-enforced difficulty, and/or do not have a high degree of decentralization in mining power. These and other features and advantages of the present invention will be explained and will become obvious to one skilled in the art through the summary of the invention that follows.

SUMMARY OF THE INVENTION

This summary is provided to introduce in simplified form concepts that are further described in the following detailed descriptions. This summary is not intended to identify key features or essential features of the claimed subject matter, nor is it to be construed as limiting the scope of the claimed subject matter The present invention is a novel blockchain mining system and method that enables a blockchain block to be marked as proofed, thereby improving the reliability of blockchain by increasing the ability to determine tampering of blockchain data. "Proofing" means a unique identifier of a such block was published to at least one other blockchain. In essence, this allows a blockchain block and its contained transaction(s) to derive a proof of legitimacy from one or more blockchains that in aggregate has greater protocol-enforced mining difficulty and/or decentralization—than the blockchain from which the transaction originates. By the use of nonfederated nodes in the present invention, a blockchain is able to derive a higher degree of reliability and security by being proofed with evidence of publication to another blockchain. By the use of nonfederated nodes, proofing is done in a permissionless, trustless, and decentralized manner. The invention's method of mining is termed "Proof-of-Proof" mining, and an nonfederated node that performs such mining is termed a "Proof-of-Proof" mining node. For the purposes of this application, one or more blockchains receiving the proof is termed "subordinate blockchain(s)" and the one or more blockchain whose are receiving publication of state data is termed "master blockchain (s j." Also contemplated within the scope of the invention is a means and system for fork resolution that ensures redundancy and prevents malicious or non-malicious interruptions to the intended functionality of the blockchain that is inheriting the security. The invention may have many applications, including but not limited to smart contracts, distributed file storage, reversible transactions, microtransactions, and distributed autonomous corporations.

The use of Proof-of-Proof mining nodes allows for publication of subordinate blockchain data to a master blockchain without the subordinate blockchain holding any private key, or trusting one or more permissioned/federated nodes to perform a task. The Proof-of-Proof nodes can use their own secured master blockchain private keys for publishing data to the master blockchain, thus the subordinate blockchain data is able to be published onto the master blockchain network without the subordinate blockchain network directly accessing any private keys of the master blockchain network.

In the present invention, nonfederated persons are incentivized to configure and maintain Proof-of-Proof mining nodes; a person running a Proof-of-Proof mining node receives consideration in exchange for publishing data of the subordinate blockchain to the master blockchain. This incentivizing increases the measure of reliability of the data on the subordinate blockchain; since persons are incentivized to perform proof-of-proof mining, and may even record multiple unique a proof of publications of the same state data many times, the subordinate blockchain state data is proofed at a high frequency and with a high level of redundancy. Thus, incentivizing proof-of-proof mining results in an increase of the degree of reliability of the subordinate blockchain state data.

Contemplated within the scope of the invention is a method of proofing one or more units of blockchain state data from a subordinate blockchain network to a master blockchain network. The method is implemented on a system of nonfederated nodes which perform the method. The method comprises the steps of: acquiring, by one or more data acquirers of one or more nonfederated nodes, one or more datum of the subordinate blockchain; publishing, by one or more publishers of one or more nonfederated nodes, the data about the subordinate blockchain to the master blockchain, which results in a publication to the master blockchain; receiving, by one or more data acquirers of one or more nonfederated nodes, a verification regarding the publication of the data to the master blockchain; validating, by one or more validators of one or more nonfederated nodes, the verification; and recording, by one or more recorders of one or more nonfederated nodes, to the subordinate blockchain a proof-of-publication.

In at least one embodiment of the invention, the method further comprises transmitting consideration in exchange for publishing data about the subordinate blockchain to the master blockchain.

In at least one embodiment of the invention, the method further comprises receiving consideration in exchange for recording the proof-of-publication to the subordinate blockchain.

Contemplated within the scope of the invention is a system of nonfederated nodes configured for a form of mining which enables the nodes of a subordinate blockchain to deterministically enforce consensus rules on the subordinate blockchain based on the presence of subordinate blockchain state data in a master blockchain. Such a system comprises a subordinate blockchain data acquirer; a subordinate blockchain data publisher; a master blockchain data acquirer; a master block chain data validator; and a proof-of-publication recorder that records to the subordinate blockchain.

In at least one embodiment of the invention, the system is further configured to comprise a consideration provider that provides consideration in exchange for recording the publication of the data of the subordinate blockchain to the master blockchain.

In at least one embodiment of the invention, the system is further configured to comprise a consideration receptor that receives consideration in exchange for recording the proof of verification status of the master blockchain to the subordinate blockchain.

Contemplated within the scope of the invention is a system of nonfederated nodes configured for a form of blockchain fork resolution. Such system comprises: one or more identifiers of subordinate blockchain forks that indicate a plurality of potential competing subchains; one or more calculators of a proof-of-publication score of each alternative blockchain that results from mapping of the potential competing subchains; one or more recorders of the proof-of-publication scores; one or more subchain removers; and one or more subchain incorporators.

Contemplated within the scope of the invention is a method of blockchain fork resolution implemented on a system of nonfederated nodes which perform the method. The method comprises: identifying subordinate blockchain forks; mapping a number of potential competing subchains that result from the identified subordinate blockchain forks; calculating a relative proof-of-proof score of each competing subchain; recording the relative proof-of-proof score and a reference to the competing subchains that resulted in the proof-of-proof score; removing a subchain from the blockchain network if a competing subchain with a higher relative proof-of-proof score is found; adding a subchain to the blockchain network if the subchain has a higher relative proof-of-proof score than competing subchains.

In at least one embodiment of the fork resolution method, the proof-of-proof score of a competing subchain is a sum of the proof-of-publication scores of its component blocks.

In at least one embodiment of the fork-resolution method, the proof-of publication scores of a component block of a subchain is a function of a quantity of proof-of-publications of the block in subsequent subchain blocks in the same subchain and a measure of the timeliness of the proof-of-publications of the block.

In at least one embodiment of the fork-resolution method, the measure of timeliness of a component block is relative to a block of corresponding position of a competing subchain.

In at least one embodiment of the fork resolution method, the timeliness is ascertained from a base time that is the earlier time of publication to a master blockchain between the block and the corresponding block on the competing subchain such that the closer to the base time that a that the block's publication occurred, the greater a weight is given to the block for proof-of-publication scoring purposes.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

Figure 1:
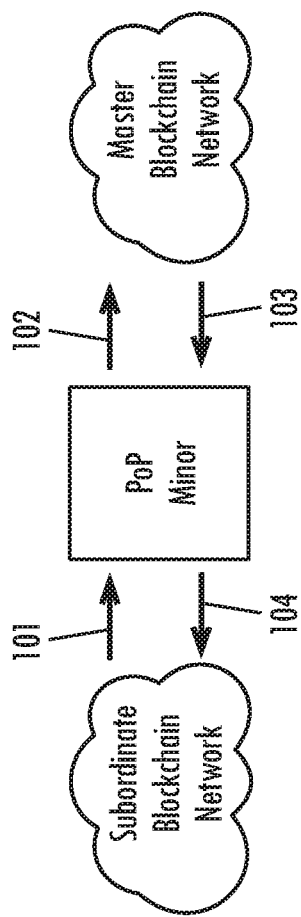
FIG. 1 illustrates a top-level view of the interaction between the Subordinate Blockchain Network, POP Miner, and Master Blockchain Network in a preferred implementation of the present invention.
Figure 3:
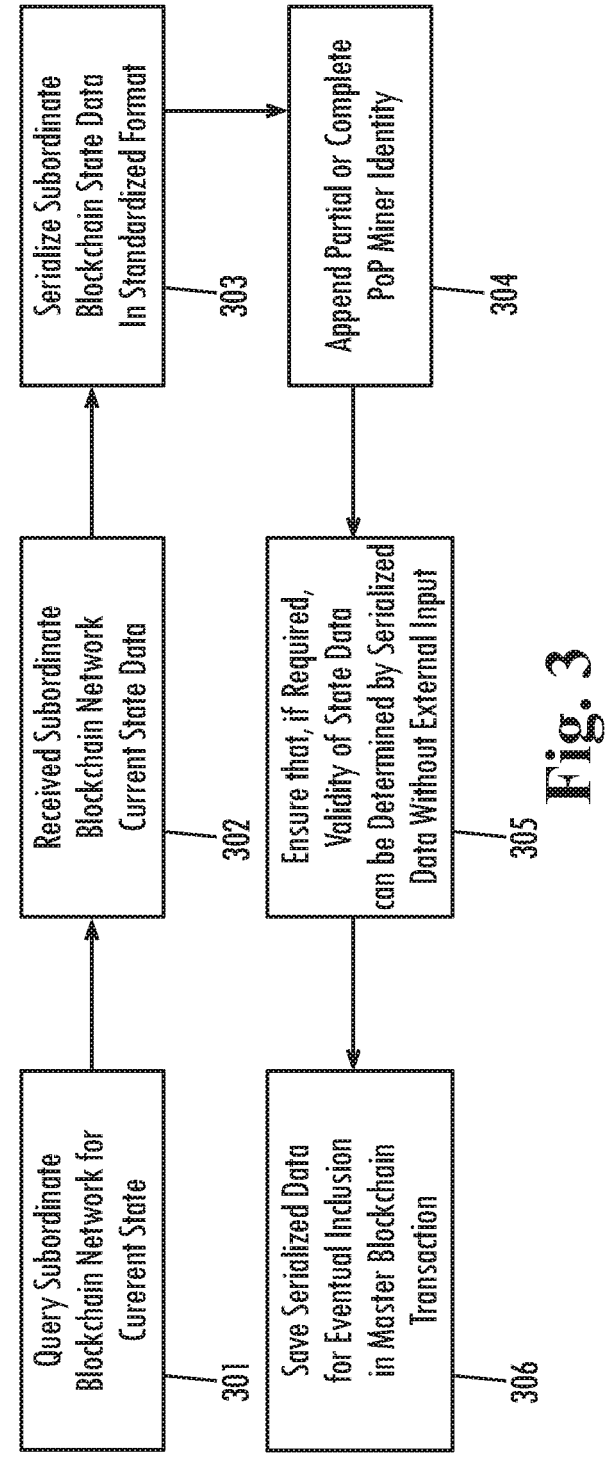
FIG. 3 illustrates a detailed view of the process of acquiring Subordinate Blockchain State Data and processing it in such a way as to enable publication of the data to the Master Blockchain (the steps covered in less detail by 204, 205.

In the Summary above and in the Detailed Description of the Invention, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps (except where the context excludes that possibility).

The term "at least" followed by a number is used herein to denote the start of a range beginning with that number (which may be a range having an upper limit, depending on the variable being defined.) For example, "at least 1" means 1 or more than 1. The term "at most" followed by a number is used herein to denote the end of a range ending that that number (which may be a range having 1 or 0 at its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)" or "(a first number) (a second number)," this means a range whose lower limit is the first number and whose upper limit is the second number. For example, 25 to 100 mm means a range whose lower limit is 25 mm, and whose upper limit is 100 mm.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

Definitions

An "address" is a multipurpose unique identifier used for tracking, payment, messaging, and/or storage. Addresses are often created by obfuscating or otherwise altering public cryptographic keys.

A "transaction" is a data structure containing zero or more source addresses (or other equivalent identifier, such as an address encumbered by the application of a hashing function) along with zero or more output addresses, which act to modify the state of a blockchain temporarily or permanently. The execution of transactions often causes the transfer of value (measured in native token or other means of consideration) from one party to another, a party identified by at least one address. On blockchains like Bitcoin, transactions are written using a limited-functionality script.

A "block" is a data structure containing zero or more transactions along with metadata often including but not limited to a block version identifier, a reference to the previous block which the current block claims to build on top of, the merkle root of the enclosed transactions, a timestamp, and some information related to consensus (such as a target commonly, called "bits" or "nbits", a mining nonce, etc.). A block builds upon the block it claims as a parent. Blocks may also contain some form of cryptographic signature or other identifier unique to the miner of a block.

A "genesis block" is a block with no existing parent block (often marked by the use of a special previous block hash similar to a "magic number").

A "blockchain" is a data structure which contains one or more blocks. The acceptance of a block into a blockchain requires that the block builds on a previous block in the blockchain (except in the special case of the genesis block), and that it does not violate any rules set by previous blocks (including but not limited to referencing transactions that do not exist, spending transactions that have already been spent, spending a transaction which is currently unspendable until additional conditions are met, or attempting to create an output quantity greater than the corresponding input quantity).

A "blockchain network" is a network of nodes which follow a common set of rules to maintain synchronized copies of a blockchain, or synchronized copies of portions of a blockchain.

A "node" is a physical computer on a blockchain network programmed by machine-readable instructions to follow a set of rules when making changes to its local copy of the blockchain, Nodes generally attempt to, by means of physical network infrastructure and protocols build thereon, communicate in near-real-time to rapidly and in a synchronized manner agree on the present state of a blockchain. Different types of nodes with different user-configured preferences and hardware restrictions including but not limited to available storage, processing power, and network bandwidth, can acquire, store, validate, and retransmit limited portions of the blockchain.

A "full node" is a node which stores and makes available to other nodes on a blockchain network a large portion of the blockchain.

An "nonfederated node" is a node which participates in a blockchain network in a trustless, permissionless manner. Nonfederated nodes do not seek the approval of any party, can join and leave the network at will, and do not have any elevated position of trust on the blockchain network.

A "resource" is a physical or virtual consumable asset such as but not limited to electricity, stake weight, tokens, or computational power.

"Mining" is the process which expends some form of resource in order to secure a blockchain.

A "mining node" or "miner" is a node which performs, by means of computer-processor-readable instructions, the additional function of performing one or more forms of mining (Proof-of-Work, Proof-of-Stake, Proof-of-Proof), thereby contributing to the security of a blockchain.

A "blockchain fork" is an event where one block in a valid blockchain has multiple children, each of which propose different but conflicting modifications to the blockchain state machine. Contemplated within the scope of the present invention is a method and system to resolve blockchain forks.

"Blockchain fork resolution" is an algorithm or algorithms by which one of the proposed modifications in a blockchain fork is chosen as valid, invalidating all other conflicting modifications and allowing the blockchain to continue to accept additional modifications (in the form of a block) which follow the rules of the chosen blockchain fork. In some instances, the delayed availability of additional information will cause a resolved fork to be re-resolved by removing the previously-accepted block and subsequent blocks which relied on the removed block, in favor for an alternative block and subsequent blocks which are valid after acceptance of the alternative block.

"Blockchain security" is a measure of the degree of a blockchain's resistance to modifications to blocks or other units of consensus previously included in the blockchain. Higher amounts of mining power on a blockchain network correlate with higher security of the blockchain of the blockchain network. This blockchain security refers to the difficulty an adversarial participant would have when attempting to modify a portion of the blockchain which nodes have already accepted as valid and applied to their local copy of the blockchain.

A "master blockchain" is a blockchain from which one or more subordinate blockchains inherit security. The master blockchain uses one or more means of security (Proof-of-Work, Proof-of-Stake, etc.) to ensure its own security. Subordinate blockchains inherit this security through the execution of Proof-of-Proof mining by Proof-of-Proof miners. The master blockchain does not require any modifications or knowledge of the operation of the subordinate blockchain(s) for which it provides security.

A "subordinate blockchain" is a blockchain which inherits security from one or more master blockchains. The subordinate blockchain generally has its own means of security (Proof-of-Work, Proof-of-Stake, etc.), as well as inherited security through the execution of Proof-of-Proof mining by Proof-of-Proof miners. The subordinate blockchain requires knowledge of the consensus rules of the master blockchain(s) from which it inherits security.

"Proof-of-Proof mining" (or "PoP mining") is a mining method of the present invention.

"Proof-of-Proof miner" (or "PoP miner") is a system of nodes that perform the method of the present invention.

"Passive listening" is a means by which a node acquires data from a blockchain network by connecting to the blockchain network, and then listening for new data to propagate across the network. In this model, upon receiving valid data while passively listening, nodes may broadcast such data to other nodes which they are connected to, which continues the propagation of the data. The passive listening model of data acquisition generally implies that a publication occurs whenever new data of a certain type becomes available. However, machine-readable instructions could set hard limits on the number of proofs allowed within a certain timeframe, block timing, recent consideration, etc.

"Active query" or "active querying" is a means by which a node acquires data from a blockchain network by connecting to the blockchain network, and then either (1) requests specific data from other nodes on a subordinate blockchain network, or (2) reacts to a user input or other external interrupt. Active querying causes a Proof-of-Proof mining system to query a passive listening node on the subordinate blockchain for the latest data it received and deemed valid. The active query data acquisition model refers primarily to a user-event causing a proof of the latest data to occur, rather than performing publication every time new data is received.

"Data origination" is a means by which a node acquires data from a blockchain network by creating the data (for example: creating a transaction, or mining a block). In a data origination model, nodes on the subordinate blockchain network would acquire data by creating it themselves. This model may offer advantages to block miners who wish to add a form of validation to the block submitted to the blockchain network (perhaps, for example, to protect their consideration received for Proof-of-Work or Proof-of-Proof mining).

A "blockchain data acquirer" acquires data from a blockchain, using one or more of the following means of data acquisition: passive listening, active querying, and data origination. A master blockchain data acquirer acquires data of a master blockchain. A subordinate blockchain data acquirer acquires data of a subordinate blockchain.

"OP_RETURN" is a means by which a node formats and/or serializes data by inserting the data into a valid blockchain transaction by using an OP_RETURN opcode or other opcode of similar function in at least one transaction scripting language of the blockchain. Transactions are configured in many blockchain networks by stack-based scripting of a physical computer processor-readable instructions with support for a variety of valid opcodes. One of these opcodes, OP_RETURN (0x6a), allows for arbitrary data (up to 80 bytes) to be placed into a provably-unspendable output. While still part of a transaction, data stored using OP_RETURN is understood by nodes on the blockchain network to not transfer any value or be in any way relevant to future transactions. As such, these nodes can prune data stored using OP_RETURN (or more commonly, prune the entire output invalidated by the OP_RETURN opcode) without jeopardizing their ability to validate transactions on the network and otherwise function as a full node. The use of OP_RETURN does not necessarily require data to be re-encoded in any format, as arbitrary bytes can be directly stored.

"Impossible addresses" is a means by which a node formats and/or serializes data by inserting the data into a valid blockchain transaction by generating one or more apparently-valid blockchain addresses which contain the data. Addresses on many blockchain networks are expected to be derived from the hash of a public key. When a user-entity or node wishes to prove to the network that it is the owner of an address, it provides both the public key (which nodes will hash to recalculate the corresponding address), along with a signature signed by the private key corresponding to the public key. However, it is possible to create apparently-valid addresses which do not correspond to a known private key; such address is known as an impossible address. For example, the address '1BitcoinEaterAddressDontSendf59kuE' appears to the Bitcoin blockchain network as valid (or plausible), since it uses only base-58 characters, and has a corresponding checksum (included primarily to prevent mistypes of addresses). In this example, the data which was formatted and/or serialized was "BitcoinEaterAddressDontSend" and the remaining portions of the address allow the address to fit the valid address format of the (in this case Bitcoin) blockchain. Data may be encoded directly into impossible addresses. Data destined for publication would need to be encoded into the base (ex. base-58 for Bitcoin and most derivatives) required of address data. Additionally, the encoded data may need to be split into multiple smaller pieces, and often requires work (such as appending extra characters and a checksum) to make the data appear as a valid address. In order to store an impossible address in a blockchain, a transaction involving said impossible address (ex: sending a quantity of native token to it) is created.

"Arbitrary data section" is a means by which a node formats and/or serializes data by inserting the data into a valid blockchain transaction by utilizing a blockchain transaction data field specifically provided for the inclusion of arbitrary data. Some blockchain networks may explicitly provide space for a transaction message (or other arbitrary data) as part of the standard transaction format. In a preferred embodiment of the invention, an arbitrary-data section exists for all transactions or all transactions of a certain type or format, which can be left empty by the sender if desired. Depending on implementation, the arbitrary data section could either allow for direct storage of bytes, or could require encoding data into some other format, including but not limited to printable ASCII, octal, hex, or base-58. Data stored in the arbitrary data section of a transaction could be pruned by network participants in a similar manner as data stored using OP_RETURN.

"Steganography" is a means by which a node formats and/or serializes data by inserting the data into a valid blockchain transaction by utilizing various steganographic techniques to insert data in transactions or portions of transactions where arbitrary data is not expected by the blockchain. In one implementation utilizing steganography, data could be encoded in the quantity of consideration sent to at least one address, or in parts of a multisig transaction script (such as a 1-of-2 multisig, where one of the addresses is actually arbitrary data, but is not necessary for spending the output). These methods are generally more difficult than non-steganographic methods, but may be valuable for avoiding the exchange of consideration, which makes arbitrary data storage more difficult to spot.

A "blockchain data publisher" formats and/or serializes data and then publishes the formatted and/or serialized data to a blockchain, using one or more of the following means of data format and/or serialization: OP_RETURN, impossible addresses, arbitrary data section, and steganography. In addition to the desired data for publication, additional data may optionally be included, including but not limited to additional information which tags the publication with an identifier which identifies the node responsible for performing the publication herein described. All of these means of encoding and publishing data involve a construction of a transaction valid on the blockchain with a certain structure, and enabling the propagation of the transaction across the blockchain network, with the goal of inclusion of the data or its encoded form in the blockchain (known as publication). A master blockchain data publisher refers to a blockchain data publisher which publishes data to a master blockchain. A subordinate blockchain data publisher refers to a blockchain data publisher which publishes data to a subordinate blockchain.

A "blockchain data receptor" receives data from a blockchain, including but not limited to blocks, transactions, proof that transactions are included in blocks, and blockchain state data, using one or more of the following means of data acquisition: passive listening, active querying, and data origination. A master blockchain data receptor receives data from a master blockchain. A subordinate blockchain data receiver receives data from a subordinate blockchain.

A "blockchain data validator" validates data which proves the successful publication of data in a blockchain by processing the data to ensure proper inclusion of the published data and to ensure that the transaction containing the published data was properly included in a blockchain block or other unit of consensus. Such processing of the blockchain verification depends on the design of the blockchain and the chosen publication model(s) used. In a preferred implementation of the technology, such processing requires the computer system to acquire by one or more of the aforementioned methods a blockchain block or other unit of consensus or the relevant portions of a blockchain block or other unit of consensus which contains the publication transaction, to parse the original publication transaction for inclusion of the publication data in the original publication transaction in accordance with the one or more publication models used in the publication, to construct and/or interpret a valid merkle path from the publication transaction or a hash of the publication transaction to the merkle root of the transactions included in the associated blockchain block, and to validate the means of blockchain block consensus with the block header data (including but not limited to recalculating the Proof-of-Work block hash for a block header and checking the calculated block hash against the block's difficulty target). A master blockchain data validator refers to a blockchain data validator which validates data from a master blockchain. A subordinate blockchain data validator refers to a blockchain data validator which validates data from a subordinate blockchain.

"Simplified payment verification" is a means by which a merkle path is constructed which proves that a transaction which published the publication data exists in a blockchain block or other discrete unit of consensus. To provide sufficient context for the merkle path, the merkle path is serialized with a block header or other similar data fields to demonstrate the inclusion of the publication data publication transaction in a blockchain block's transactions.

"Cryptographic accumulator proof" is a means by which some witness is constructed which demonstrates the inclusion of a transaction containing publication data in a block or other discrete unit of consensus. Depending on the cryptographic accumulator, additional data and/or metadata may be required to further demonstrate the cryptographic accumulator's relation to the state of the blockchain, and/or the block or other discrete unit of consensus's relation to other portions of the blockchain.

"Full block submission" is a means by which the entire block from the blockchain which includes the publication data transaction is serialized or otherwise reproduced. This can occur when a block miner performs Proof-of-Proof mining on a block they mined. A "recorder of blockchain proof" produces valid demonstration or witness to the validity of the data proving successful publication of the publication data to a blockchain, using one or more of the following means of producing the valid demonstration or witness: simplified payment verification, cryptographic accumulator proof, and full block submission, and subsequently enables the propagation of such demonstration or witness to another blockchain. A recorder of master blockchain proof refers to a recorder of blockchain which records data to a master blockchain. A recorder of subordinate blockchain proof refers to a recorder of blockchain proof which records data to a subordinate blockchain.

DESCRIPTION OF INVENTION

Proof-of-Proof mining is a process by which miners acquire and publish blockchain state data like a block header from a subordinate blockchain, and subsequently provide proof of having successfully done so, in order to secure the subordinate blockchain by providing data which can be referenced FIG. 1 if or when a portion of the subordinate blockchain is challenged by the introduction of blocks which could cause a blockchain fork 1101. A method, according to the present invention, for this process of proofing units of blockchain state data from a subordinate blockchain network to a master blockchain network, is implemented on a system of nonfederated nodes known as "Proof-of-Proof miners." The method comprises the steps of acquiring one or more datum of the subordinate blockchain 101, 202, 301, 302; publishing the data about the subordinate blockchain to the master blockchain 102, 204, 205, 206, 207, 208, 303, 304, 305, 306; receiving a publication verification regarding the publication of the data to the master blockchain 103, 209, 401; validating the publication verification 402; and recording a proof of the verification publication to the subordinate blockchain 104, 210, 211, 212, 402, 403, 404, 405, 405, 407.

Contemplated within the step of acquiring 101, 202, 203, 301, 302, by a data acquirer, one or more datum of the subordinate blockchain 509, 601, 603, 702 is a means of acquiring data which may be performed by any subset or combination of these models: passive listening, active queries, and data origination.

Contemplated within the step of publishing 102, 204, 205, 206, 207, 208, 303, 304, 305, 306, 703, by a publisher, one or more datum of the subordinate blockchain 601, 702 is a means of publishing data which may be performed by any combination or subset of these models: OP_RETURN, impossible addresses, arbitrary data section, and steganography. In addition to subordinate blockchain data, additional information may optionally be included, including but not limited to additional information 211, 304, 602 which tags the publication 603 with an identifier which identifies the node responsible for performing the publication 703 herein described. The step of publishing 102, 208, 703, by one or more physical computer processors, the data about the subordinate blockchain 302, 509, 601, 603, 702 to the master blockchain may include encoding and/or serializing 204, 303, 603 the data before publication. All of these means of encoding and publishing data involve a construction of a transaction 205 valid on the master blockchain with a certain structure, and enabling the propagation of the transaction 102, 208, 703 across the master blockchain network, with the goal of inclusion of the data or its encoded form in the master blockchain. What follows is a description of these means.

Contemplated within the step of proving the success 104, 210, 402, 407, 704 of the aforementioned described publication 703, by one or more physical computer processors, is a means of acquiring 103, 209, 401, 704 data of the master blockchain which may be performed by any subset or combination of passive listening, active queries, and data origination.

No matter the method for validating data of the master blockchain, the primary goal is to provide proof 104, 402, 407 to the subordinate blockchain network that a transaction containing data 205, 703 encoded in some fashion 204, 303, 304, 305, 306, 603 as described previously was included into a valid block (or other unit of consensus) on the master blockchain. Contemplated within the step of receiving, by one or more physical computer processors, the verification of inclusion of data in the master blockchain 704, 705, 1003, 1004, 1102, 1103, is a means of verifying 402 data which may be performed by any subset or combination of these models: master node access, and entire blockchain storage.

In a master node access model, the subordinate Proof-of-Proof mining node utilizes technologies like thin-clients, SPV proofs, and bloom filters to connect to and either send queries to or subscribe for updates regarding the state of the master blockchain from existing nodes on a master blockchain 206, 401, 703.

In an entire blockchain storage model, the subordinate Proof-of-Proof mining node runs a full or other form of node on the master blockchain, which can be queried for the current state of the master blockchain at any point in time.

Contemplated within the step of recording by one or more physical computer processors, one or more proof 210, 402, 403 of data of the master blockchain to the subordinate blockchain to prove successful completion of the previous publication of subordinate blockchain data to the master blockchain is a means of publishing data 212, 407, 704, 705, 1003, 1004, 1102, 1103 which may be performed by the data publisher which may employ any combination or subset of these models: simplified payment verification proof, cryptographic accumulator proof, and full block submission. No matter the means of constructing proof of successful publication of subordinate blockchain state data to a master blockchain, the constructed proof 211, 212, 402, 407, 705, 1003, 1004, 1102, 1103 must be enabled to propagate 104 across the subordinate blockchain network in a timely manner.

Contemplated within scope of the invention a method of providing consideration by the use of a consideration provider. Such consideration is provided in exchange for publishing data about the subordinate blockchain 102, 208, 302, 509, 603 to the master blockchain. Such method includes constructing the master blockchain transaction containing subordinate blockchain state data such that it provides consideration for the master blockchain network node(s) which include the master blockchain transaction containing subordinate blockchain data 102, 208, 302, 509, 603, 702 in the master blockchain.

In a preferred embodiment of the invention, the means of providing consideration uses a transaction fee which is paid to the master blockchain block miner(s). The master blockchain block miner(s) include the transaction in a block they generate. In most blockchains, the transaction fee of a transaction is calculated by subtracting the sum of the output(s) from the sum of the input(s).

Contemplated within scope of the invention is a method of receiving consideration using a consideration receptor. Such consideration is received in exchange for recording 104, 212, 407, 704 the proof of publication status 210, 211, 212, 401, 402, 407, 705, 1003, 1004, 1102, 1103 of the master blockchain to the subordinate blockchain. The node which performed the original publication of subordinate blockchain data 101, 102, 202, 203, 208, 302, 306, 509, 603, 703 to the master blockchain receives consideration upon successful validation of the proof of publication of the transaction containing subordinate blockchain data to the master blockchain based partially or entirely on the miner identification data 204, 304, 602, 603 contained or partially contained in the data which is published to the master blockchain 102, 208, 703.

In a preferred embodiment of the invention, the consensus rules of the subordinate blockchain provide rewards schemes for block miners through coinbase transactions in some blockchains, consideration to the node(s) which successfully performed Proof-of-Proof mining FIG. 1. In such an embodiment, the balance(s) of the node(s) which successfully performed Proof-of-Proof mining with the final proof of publication 212, 405, 406, 407 occurring in a subordinate blockchain block would be increased, or the proof of publication submitted to the subordinate blockchain, or a derivative thereof, would be spendable in a similar fashion to a coinbase transaction. As such, the presence of a particular proof of publication 1003, 1004, 1102, 1103 in a block 1001, when the block is processed or another later block is processed in the case of delayed consideration and/or aggregation of consideration, causes one or more changes to the blockchain which result in consideration for the node responsible for the particular proof of publication.

In another embodiment of the invention, one or more network nodes with privilege on the subordinate blockchain could provide the consideration after they perform validation of the proof of publication 212, 407, 704, 705. Such consideration could either be an instruction for the blockchain to create new tokens assigned to the node responsible for the successful publication of subordinate blockchain data, or could be existing tokens assigned to the node responsible for the successful publication of subordinate blockchain data.

Figure 7:
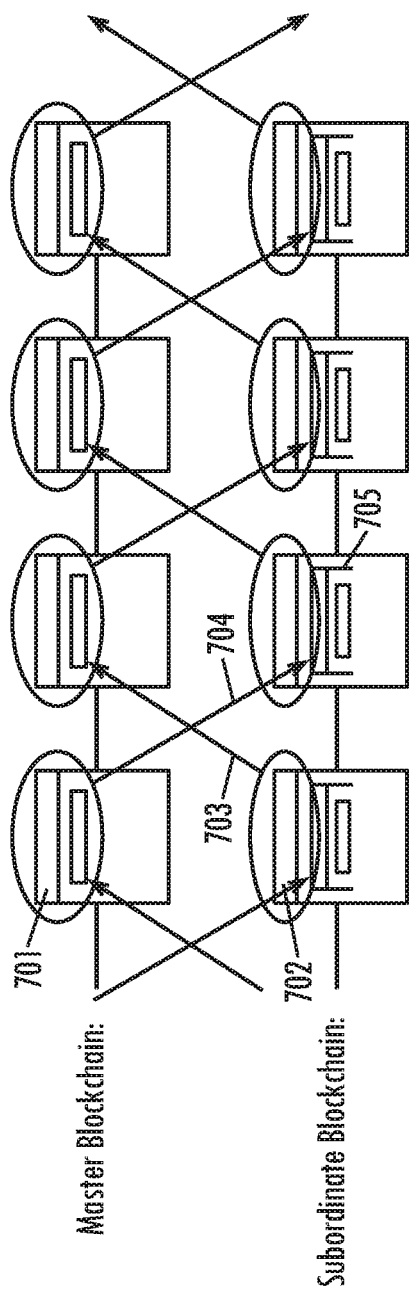
FIG. 7 illustrates the relationship between the subordinate and master blockchain with regards to data publication. The block header (or other blockchain state data) from the subordinate blockchain 702 is published to the master blockchain 703, and then a proof of that publication is constructed 705 and published to the subordinate blockchain 704 which demonstrates the existence of data proving the subordinate block header 702 inside the master block header 701. This publication and proof of publication process is done by a PoP miner, who takes blockchain state data from the subordinate blockchain (a block header, in this instance), publishes it to the master blockchain, waits for a block on the master blockchain

Thus, in at least some embodiments, PoP miners serve as the communication/transactional bridges between a subordinate blockchain and a master blockchain 101, 102, 103, 104, 201, 206, 208, 212, 407, 703, 704, facilitating the process illustrated in FIG. 7. As often as they wish, PoP miners will take the most recent blockchain state data from the subordinate blockchain 702, and publish it 703 to the master blockchain along with some identifier 602, 603 which allows them to later receive consideration by creating a master blockchain transaction with the subordinate blockchain state data and identifier embedded in it, and submitting the transaction to the master blockchain network 102, 208, 703. The PoP miner then waits for the transaction to be included in a master blockchain block 209, 401, 701, constructs some form of proof of publication 210, 402, 403, 705, adds any identifying information necessary 211, 404, 602 for them to take credit for the publication, and submit this proof back to the subordinate blockchain in the form of a special PoP mining transaction 212, 407, 704, 705, 1003, 1004, 1102, 1103.

Figure 10:
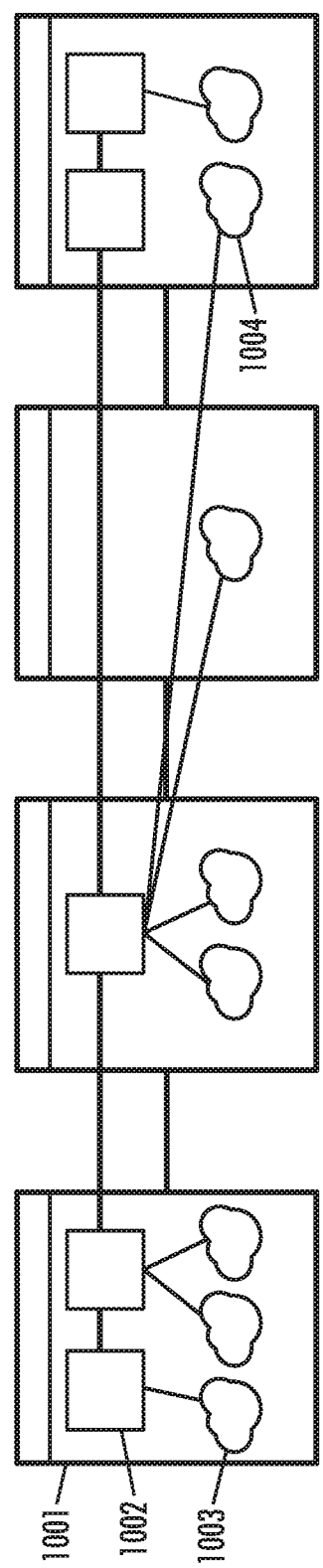
FIG. 10 illustrates the embedding of proof-of-proofs 1003 which demonstrate publication of subordinate blockchain state data to the master blockchain. Note that proof-of-proofs can reference master blockchain block headers that are included in the same subordinate blockchain block, or in any previous subordinate blockchain block. Some implementations may limit the distance a PoP publication can reference back in the master blockchain block headers maintained by the subordinate blockchain, either by master blockchain height or containing subordinate blockchain height.

In at least some embodiments, the specialized PoP mining transaction demonstrates that subordinate blockchain state data 202, 301, 302, 509, 601, 602, 603, 702 was included in a master blockchain transaction which was included in a master blockchain block 209, 210, 401, 402, 704. As such, it needs to contain the subordinate blockchain state data 202, 301, 302, 509, 601, 602, 603, 702 which was originally published (along with the miner identification 204, 304, 602), the master blockchain transaction containing the subordinate blockchain state data, the merkle path (or another form of proof such as a witness for a cryptographic accumulator, if the master blockchain uses a structure other than a merkle tree for transactions) which demonstrates inclusion of the transaction in a master blockchain block 210, 402, 705, and the master blockchain block header 701, 802, 901, 902 corresponding to the block in which the subordinate blockchain state data was published 212, 407, 705, 1003, 1004, 1102, 1103. Additionally, the mining transaction needs to provide the full miner identification 405, 602 if it wasn't included in its entirety in the published data 204, 304 (example: the full address whose first 16 bytes match the 16 bytes of miner identification published in an OP_RETURN 204). Finally, additional contextual information may be required, such as sufficient previous block headers 802, 901, 902, 1002 from the master blockchain to enable the subordinate blockchain to construct and validate the entire master blockchain up to the block holding the PoP miner's publication as illustrated in FIG. 10. The simplest algorithm for this requires that the PoP miner submit adequate master blockchain block headers to build from the subordinate network's previously-known highest-height master blockchain header to the header of the block in which the PoP publication occurs.

In at least some embodiments, peers on the subordinate blockchain validate a PoP mining transaction 212, 407, 705, 1003, 1004, 1102, 1103 by checking the validity of the published subordinate blockchain state data, checking for its inclusion in the provided master blockchain transaction, ensuring the master blockchain transaction is included in the provided master blockchain block header's merkle tree (or evaluating some other form of proof, such as a cryptographic accumulator witness), and ensuring that the provided block header(s) of the master blockchain 802, 901, 902 build the "longest" PoW chain on the master blockchain.

In at least some embodiments, checking the validity of the subordinate blockchain state data requires only looking back in the subordinate blockchain for the block corresponding to the published state data 202, 302, 509, 601, 603. Checking for its inclusion in the provided master blockchain transaction involves parsing the transaction and checking the data embedded using OP_RETURN, or for the blockchain state data to appear in an encoded form, such as inside multisig addresses. Then, the master blockchain transaction is hashed and the corresponding master blockchain transaction merkle path is followed, which should result in the merkle root embedded in the provided master blockchain block header. Since only the headers of a pure PoW blockchain are sufficient for determining consensus on blocks, subordinate blockchain peers have sufficient information to ensure that the PoP publication occurred in a valid master blockchain block.

In order for PoP mining transactions to later be used for consensus 1101, they must be stored in the subordinate blockchain 1003, 1004, 1102, 1103. Additionally, the block headers of the master blockchain 802, 901, 902 need to be stored in such a way that consensus of the master blockchain can be tracked without requiring peers to interface with the master blockchain network. As such, in at least some embodiments of the invention, the blocks on a blockchain implementing PoP contain a special segment to hold the new master blockchain block headers since the last subordinate blockchain block's included master headers. By linking together the master blockchain headers stored in the subordinate blockchain FIG. 9, the entire master blockchain's PoW consensus can be confirmed. In the event that a fork on the master blockchain occurs, a subordinate block can include multiple competing blocks 901, and allow master blockchain headers embedded in future subordinate blockchain blocks to resolve the conflict 902. Proof-of-proof mining transactions can reference, as the master blockchain block in which they published subordinate blockchain state data, any master blockchain block headers stored in their enclosing block or in previous blocks FIG. 10. To facilitate this, block miners take the block header data provided by the PoP mining transactions, and embed the zero or more master blockchain headers necessary to provide context for the PoP mining transactions they wish to include in their block.

Contemplated within the scope of the invention is a system of nonfederated nodes configured by machine-readable instructions for a form of blockchain fork resolution comprising one or more identifiers of subordinate blockchain forks that indicate a plurality of potential competing subchains 1101; one or more mappers of the potential competing subchains; one or more calculators of a relative proof-of-proof score of each alternative blockchain that results from mapping of the potential competing subchains; one or more recorders of the proof-of-publication scores; one or more subchain removers; and one or more subchain incorporators. In at least one embodiment of the invention, the calculators of the proof-of-proof scores calculate the scores using a function of a quantity of proof-of-publications of each competing subchain block and a measure of the timeliness of the proof-of-publication of each competing subchain block relative to its competing subchains' corresponding block's time of proof-of-publication 1102, 1103.

Contemplated within the scope of the invention is a method of block chain fork resolution that is implemented on a system of nonfederated nodes which perform the method, the method comprising: identifying subordinate blockchain forks 1101; mapping a number of potential competing subchains that result from the identified subordinate blockchain forks; calculating a proof-of-publication score of each potential blockchain that results from each potential subchain; recording the proof-of-publication score and a reference to the competing subchain that resulted in the proof-of-proof score; removing a subchain from the blockchain by deleting the local copy or otherwise marking it as presently invalid if a competing subchain with a higher proof-of-publication score is found; adding a subchain to the blockchain network if the subchain has a higher proof-of-publication score than all other competing subchains.

In at least one embodiment of the invention, the proof-of-publication score is a function of a quantity of proof-of-publications 1003, 1004, 1102, 1103 of each competing subchain block and a measure of the timeliness of the proof-of-publication of each competing subchain block.

In at least one embodiment of the invention, the proof-of-proof scores of two competing subchains is a relative measurement; the scores are calculated for competing chains based on information present within the proof-of-publications of publication in each of the competing chains, if there are any proof-of-publications present within either of the competing subchains. The scores are a function of (1) a measure of timeliness of a proof-of-publications and (2) an amount of proof-of-publications.

In at least one embodiment of the invention, each block within a competing subchain is scored relative to a block of corresponding position of a competing subchain as a function of (1) a measure of timeliness of publication of the subordinate block to a master blockchain and (2) a value corresponding to the number of proof-of-publications of the block found in subsequent blocks on the subchain. Between two such blocks, the time of earliest publication to a master blockchain is determined from data within the proof-of-publications. This earliest time point is set as a "base time." The calculator ascertains from this base time a measure of "timeliness" of the publication to a master blockchain of the competing block. The closer to "base time" that a block's publication occurred, the greater a weight is given to the block relative to the corresponding competing block for proof-of-publication scoring purposes. A subchain's proof-of-publication score is a sum of the scores of its blocks.

Thus, in PoP fork resolution, the PoP score of a competing subchain is calculated relative to another subchain competing with it, because the timeliness of proof-of-publications in the master blockchain determines the Proof-of-Publications weight for calculation of the Proof-of-Publication score of a block, and thus the Proof-of-Proof score of the competing subchain, and the timeliness of a PoP publication of a subordinate block at a particular height relative to the first publication of any subordinate block from any of the considered forks.

In order for a peer on the subordinate blockchain network to perform fork resolution, the peer must construct and evaluate a version of the master blockchain using all of the master blockchain headers provided by all of the subordinate blockchain blocks (including those on every potential fork for which the client has knowledge). In order to do so, the peer collects every single master blockchain header from the subordinate blockchain blocks, and determines consensus according to the rules of the master blockchain.

By utilizing information available from all potential forks when reconstructing the master blockchain, the peer can ensure that whatever final picture they get of the master blockchain represents the state of the master blockchain at the latest time any of the blocks in any of the forks were created, allowing for evaluation nearly as if the peer had direct access to the entirety of the master blockchain.

Through this mechanism, the relative weight of any two particular chains can be calculated on-demand by peers who join the network at a later point in time.

In a preferred embodiment, the weight of two competing forks is calculated by the calculators summing up all of the proof-of-proof scores of all of the blocks for which two chains diverge. The scores of competing blocks between multiple forks are calculated relative to each other, following this process:

For all competing blocks at height n, find all PoP mining transactions in each chain that match said chain's block at height n For all PoP mining transactions endorsing any block at height n from all competing chains, find the one with the earliest publication (by block height) in the master blockchain. Store this height as m For each competing block n:

For each PoP mining transaction endorsing block n:

If the PoP mining transaction publishes to a block in the longest known master blockchain fork:

Determine the difference in master blockchain publication height from m, add the value floor(1/((difference+1)*(difference+1))) to the score for the current block n.

The use of relative weighting of PoP mining transactions based on their timeliness in the master blockchain makes it incredibly difficult for an attacker to produce a fork any significant period of time into the future without forking the master blockchain itself.

As such, an attacker needs to generate their potential fork of the blockchain alongside the legitimate network, and must do so in full public view by publishing the block hashes of their forking chain in the master blockchain. Anyone can monitor the master blockchain for forks being built and delay accepting transactions until the fork is resolved, and subordinate blockchain networks can implement additional features to invalidate these chains using mechanisms such as balance-based voting to invalidate the attacker's chain before it is released onto the network.

The weighting function suggested for a PoP mining transaction is floor(1/((distance+1)^2)), where distance is the afore-described distance between the PoP mining transaction's corresponding master blockchain block and the first master blockchain block in which any block of any considered competing chain at the same index was first published to the master blockchain. This formula can be tweaked to better fit the desired security profile of a particular subordinate blockchain network. Using a function which trends towards 0 faster will result in an existing blockchain being easier to attack, but also increases the possibility of short-term in-step attacks, where an attacker attempts to get a single block in their attacking chain into a master blockchain block before the corresponding legitimate chain block occurs on the network. This suggested function will continue to be tweaked as we run more simulations of different attack scenarios.

As with all consensus mechanisms, an adversarial party can attempt to force the network to reestablish consensus. On a properly-implemented PoP network, these attack vectors include forking the master blockchain and building and proving an alternate subordinate blockchain. Some of the design decisions of PoP eliminate other potential attack vectors of simpler theoretical PoP-like implementations.

In the event that an adversarial party successfully forks the master blockchain, they can rewrite the forked master blockchain blocks with new PoP data, enabling them to produce a subordinate blockchain with a higher PoP weight. The amount/length (measured in real-world time, not blocks) of the subordinate blockchain they are able to rewrite is approximately equal to the distance they successfully fork the master blockchain for.

Note that a fork of the master blockchain without specific intention to fork the subordinate blockchain won't result in a subordinate blockchain fork. However, such a reorganization of the master blockchain will cause subordinate blockchain's PoP mining transactions which occurred in the forked master blockchain blocks to no longer exist in the master blockchain, and thus hold no weight.

In the event that the master blockchain forks but doesn't do so to attack the subordinate blockchain, and the subordinate blockchain's PoP mining transactions are impacted and no longer hold weight, the current security of the subordinate blockchain will drop down to its own intermediate (PoW/PoS/etc.) consensus mechanism until PoP miners publish new blockchain state data to the master blockchain and provide PoP mining transactions back to the subordinate blockchain.

Performing this attack requires that the adversarial party build an alternate subordinate chain which has a higher proof weight than the current subordinate chain. In order to pull off this attack successfully (due to proofs being evaluated on their timeliness), an attacker would need to build their attacking blockchain simultaneously with (or faster than) the current subordinate chain. This requires that the attacker publish their attacking chain's blockchain state data to the master blockchain promptly, allowing users of the network to see the pending attack and its' properties. As such, anyone watching the master blockchain would see what block(s) are at risk for the fork, how much stronger (or weaker) the current chain is compared to the adversarial party's chain, and could potentially use some means (like balance-based voting) to invalidate the adversarial chain before it is released to the network.

In another possible (although more difficult) implementation, the attacker would build an alternate subordinate chain whose earlier blocks have little-to-no proof weight when compared to the current chain, but whose later blocks are published extensively to the master blockchain. This sort of attack would still be publicly-visible due to the publications on the master blockchain, but it would not necessarily reveal how far back the fork could occur, and would also not appear to users of the network at the time when some of the earlier blocks of the attacking chain were being built without proof weight. To mitigate this attack, blockchain networks could weight blocks closer to the forking point with significantly more weight (so the sum might look something like $100*weight_0+70*weight_1+55*weight_2 \ldots$ ), making this attack difficult or impossible to successfully perform.

In a version of a PoP implementation where the subordinate blockchain state data published to the master blockchain isn't enough to verify the potential validity of the data, an adversarial party could cause parties on the network to delay in accepting transactions by faking a potential fork which doesn't actually exist. This attack does not require overpowering the intermediate consensus, but only allows the attacker to be a nuisance because the network won't fork if the attacker can't provide the complete blocks for which data tagged to the master blockchain exists. This attack involves the attacker publishing apparently-valid blockchain state data for which they don't actually have blocks for.

In a subordinate blockchain which relies solely on PoW for immediate consensus, this can be mitigated by requiring, as PoP currently does, the publication of the entire block header. This way, the attacker cannot publish bogus subordinate blockchain data because the data would not be a valid PoW solution. In a subordinate blockchain employing PoS, it may be possible to publish additional information proving the ownership of coin age or similar network mining resources, or which could be verified by informed network participants such as full nodes.

Figure 2:
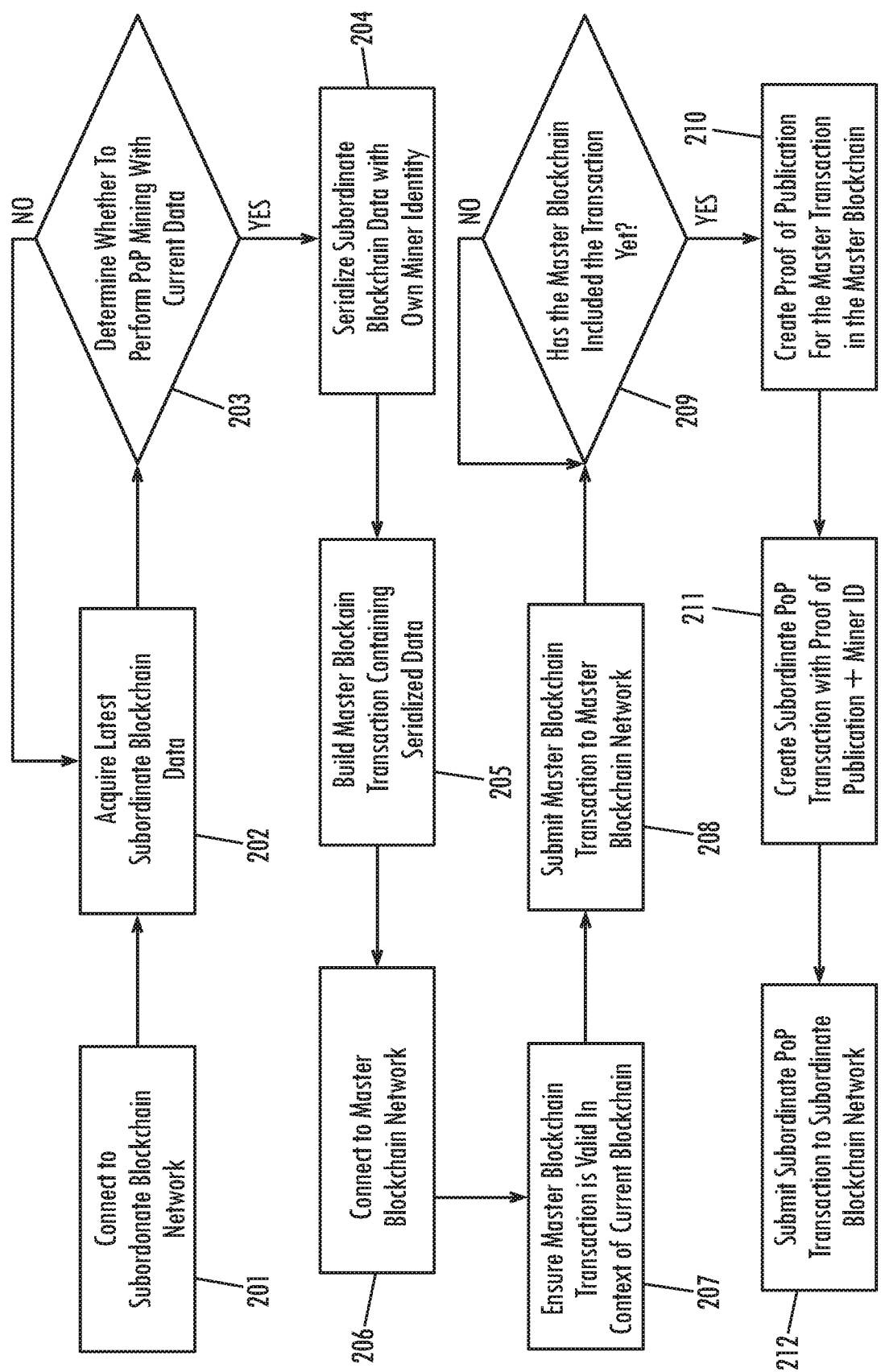
FIG. 2 is a flowchart diagram illustrating a detailed explanation of the process outlined in FIG. 1, showing the steps of connecting to blockchain networks, acquiring data, processing said data, and communicating the processed data or a derivative thereof to the other blockchain network.
Figure 4:
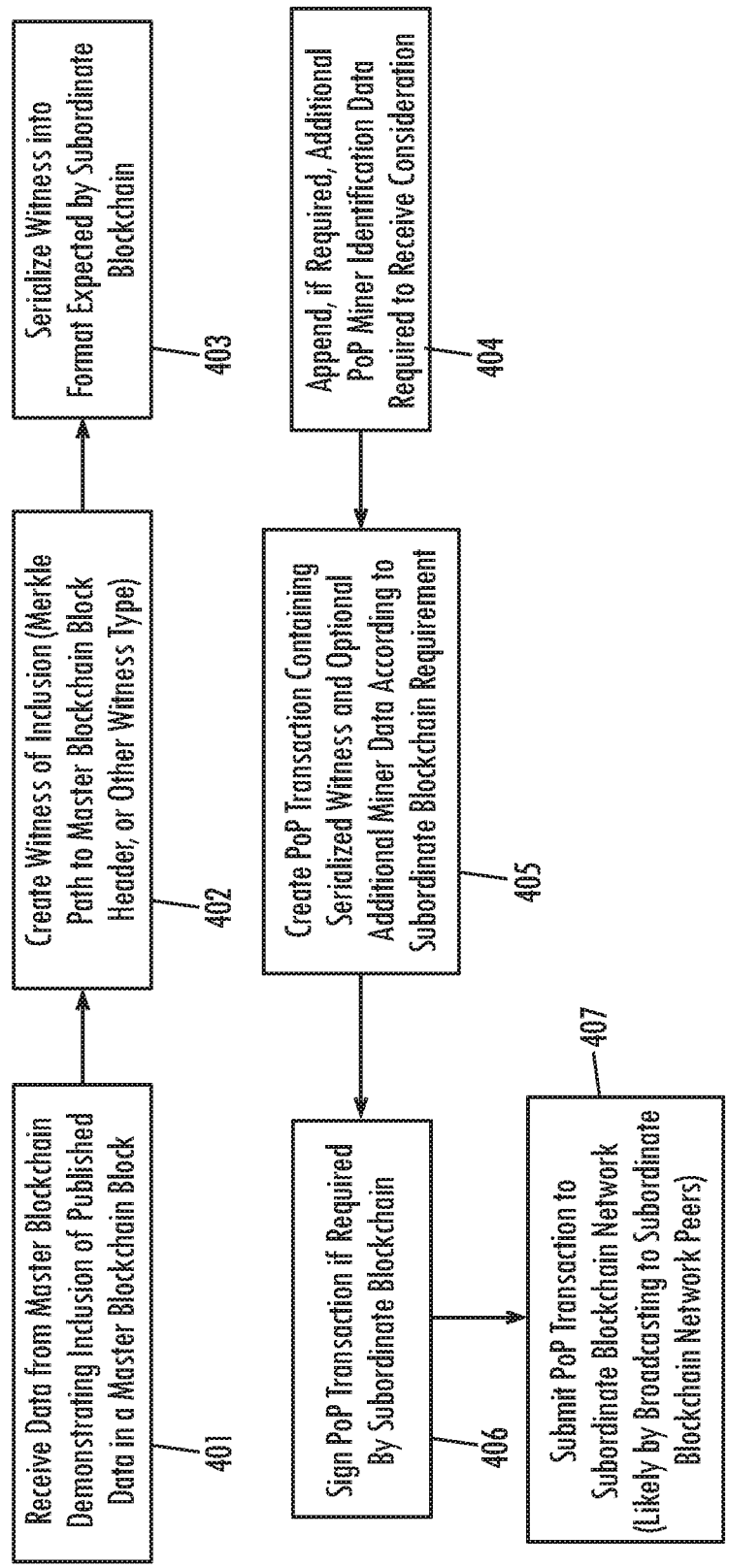
FIG. 4 illustrates a detailed view of the process of acquiring Master Blockchain Data which demonstrates the inclusion of the relevant Subordinate Blockchain State Data in the Master Blockchain, and processing it in such a way as to allow publication of the Master Blockchain Data or a derivative thereof to the Subordinate Blockchain to prove publication of the data from FIG. 3.

| Component List for Drawings | |
|---|---|
| Component Number | Component Description |
| FIG. 1 | |
| 101 | PoP Miner receives Subordinate Blockchain State Data from the Subordinate Blockchain Network through any of the mentioned methods of receiving Subordinate Blockchain State Data |
| 102 | PoP Miner submits some or all of the Subordinate Blockchain State Data, along with optionally additional data dependent on the implementation, to the Master Blockchain Network |
| 103 | PoP Miner receives some Master Blockchain data from the Master Blockchain Network which demonstrates the inclusion of the previously-submitted data 102 in the Master Blockchain |
| 104 | PoP Miner submits some or all of the Master Blockchain data 103 with optional additional processing for reasons including but not limited to reducing the size of the proof of publication, and with optional additional miner identification information, to the Subordinate Blockchain Network |
| FIG. 2 | |
| 201 | PoP Miner connects to the Subordinate Blockchain Network (or, in the event that the process described by FIG. 2 is repeated multiple times, the connection may still be open from a previous iteration, in which case the liveliness of the connection should be ensured, and a reconnection to the Subordinate Blockchain Network should be reacquired if necessary) |
| 202 | PoP Miner acquires the latest Subordinate Blockchain State Data, such as the latest block header of the Subordinate Blockchain |
| 203 | PoP Miner determines whether to perform PoP Mining with the current data 202. Decision may be influenced by factors including but not limited to whether the POP Miner has already published the Subordinate Blockchain State Data, how many times the Subordinate Blockchain State Data has been published to the Master Blockchain, whether the PoP Miner has sufficient native tokens on the Master Blockchain to pay for the publication of the Subordinate Blockchain State Data, the current Transaction Fee on the Master Blockchain, how much time has elapsed since the POP Miner most recently performed a round of PoP Mining. |
| 204 | PoP Miner serializes the Subordinate Blockchain State Data 202 into a format which will allow publication of the Subordinate Blockchain State Data or a derivative thereof to the Master Blockchain, optionally including a partial or complete POP Miner identity with which to receive consideration for the process of PoP Mining |
| 205 | PoP Miner builds a Master Blockchain Transaction (or in some cases, multiple associated Master Blockchain Transactions) which contain(s) the serialized data 204 |
| 206 | PoP Miner connects to the Master Blockchain Network (or, in the event that the process described by FIG. 2 is repeated multiple times, the connection may still be open from a previous iteration, in which case the liveliness of the connection should be ensured, and a reconnection to the Master Blockchain Network should be reacquired if necessary) |
| 207 | PoP Miner ensures that the Master Blockchain Transaction 205 is valid within the context of the current Master Blockchain's current state. This may involve processes including but not limited to ensuring that a transaction spent by the created transaction 205 has not already been spent, that the transaction spent by 205 can currently be spent, and that the transaction fee (if any) paid by 205 will allow the timely or eventual (depending on implementation and PoP Miner configuration) publication in the Master Blockchain |

Component List for Drawings

| Component Number | Component Description |
|---|---|
| 208 | PoP Miner submits the transaction 205 to the Master Blockchain, possibly but not necessarily by broadcasting the transaction to one or more other nodes/peers to which the PoP Miner is connected with on the Master Blockchain Network |
| 209 | PoP Miner continually (or possibly with a configurable delay) checks to determine whether the current state of the Master Blockchain demonstrates that the transaction 205 has been included in the Master Blockchain, until seeing that the transaction 205 has been included in the Master Blockchain (or another interrupt is triggered, such as seeing a state in the Master Blockchain which will prevent the inclusion of the transaction 205, the Master Blockchain still does not include the transaction 205 after a threshold of time defined by block height or regular time, etc.) |
| 210 | PoP Miner constructs a Proof of Publication demonstrating the inclusion of the transaction 205 in the Master Blockchain. Such a Proof of Publication may be a Merkle path, a witness for a cryptographic accumulator, or any other demonstration of inclusion of the transaction 205 in the Master Blockchain. Additional information needed for context of the Proof of Publication (including but not limited to previous block headers) may also be collected and included as part of the Proof of Publication). |
| 211 | PoP Miner creates a Subordinate Blockchain PoP Transaction including the Proof of Publication 210 along with, optionally, PoP Miner identification used to provide consideration for the PoP Miner performing the PoP Mining process. |
| 212 | PoP Miner Submits the Subordinate PoP Transaction 211 to the Subordinate Blockchain Network. |

FIG. 3

| | |
|---|---|
| 301 | PoP Miner queries the Subordinate Blockchain Network for the current state of the Subordinate Blockchain (Subordinate Blockchain State Data), or optionally in the case that the PoP Miner is continually connected to the Subordinate Blockchain Network and stays updated with the current state of the Subordinate Blockchain, queries its own local copy of the Subordinate Blockchain |
| 302 | PoP Miner receives the Subordinate Blockchain State Data from the network and/or from its own local, synchronized storage of the Subordinate Blockchain |
| 303 | PoP Miner serializes the received Subordinate Blockchain State Data 302 into a standardized format specified by the implementation |
| 304 | PoP Miner optionally appends a partial or complete PoP Miner identity, used to receive consideration for performing PoP Mining |
| 305 | PoP Miner ensures that the serialized data 303 has sufficient information for the validity (such as a block header encoded in the Subordinate Blockchain State Data meeting a PoW difficulty target, in the case of a PoW Subordinate Blockchain) to be validated |
| 306 | PoP Miner saves the serialized data 303 for eventual inclusion in a Master Blockchain Transaction 205 or builds a Master Blockchain Transaction 205 immediately, depending on configuration and the state of the Master Blockchain and Master Blockchain Network |

FIG. 4

| | |
|---|---|
| 401 | PoP Miner receives data from the Master Blockchain which demonstrates the inclusion of the submitted Master Blockchain Transaction 205 in the Master Blockchain. |
| 402 | PoP Miner creates a witness of inclusion such as a Merkle Path or a witness for a cryptographic accumulator which provides proof that the Master Blockchain Transaction 205 was included in the Master Blockchain |
| 403 | PoP Miner serializes the witness 402 into a standard format which adheres to the format requirements of the Subordinate Blockchain Network for the serialized witness data in a PoP Transaction |
| 404 | PoP Miner appends, optionally, additional information to the serialized witness 403 with which to receive consideration for performing PoP Mining |
| 405 | PoP Miner creates a POP Transaction which contains the serialized witness along with optional additional information 404 according to the requirements dictated by the implementation of PoP Mining on the Subordinate Blockchain |
| 406 | PoP Miner signs the PoP Transaction if required by the implementation of POP Mining on the Subordinate Blockchain |
| 407 | PoP Miner submits the PoP Transaction to the Subordinate Blockchain Network |

FIG. 5

Figures 5, 6:
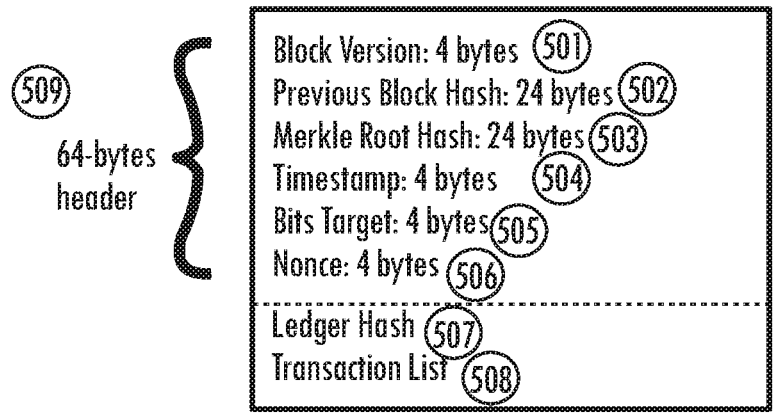
FIG. 5 illustrates one embodiment of a block with its included fields. The first six fields (block version, previous block hash, merkle root hash, timestamp, bits target, and nonce) comprise a 64-byte block header. The 64-byte block header is designed to fit within an 80-byte OP_RETURN along with 16 bytes of miner identification data used to provide consideration.
FIG. 6 illustrates one embodiment of the serialization of a 64-byte block header (comprised of items 601, 602, 603, 604, 605, and 606 from FIG. 5) along with 16 bytes of miner identification (the first 16 bytes of 602), to produce 80 bytes of data 603 which would be published to a master blockchain when performing PoP mining.

| | |
|---|---|
| 501 | 4 bytes of data which represent the version of a block, used primarily to signal support for updates/update compliance to the blockchain's protocol |
| 502 | 24 bytes of data which represent the hash of the previous (or parent) block, used to order blocks in a blockchain |
| 503 | 24 bytes of data which represent the merkle root of the included transactions (and optionally additional block data, for blocks on blockchains where the protocol dictates additional information (such as a ledger hash) should be included in a block). |
| 504 | 4 bytes of data which represent the timestamp (generally UNIX-epoch style) at which the miner mined the block. |
| 505 | 4 bytes of data which represent the target (a compact scientific-notation-like number which a valid PoW solution must fall under to be considered a valid solution). This target can be converted to a difficulty. |
| 506 | 4 bytes of data which represent the nonce which, when combined with the rest of the block header, produce a PoW solution lower than the embedded target encoded in 506 |
| 507 | A field introduced for one preferred embodiment of the VeriBlock blockchain, which holds a hash of the balance sheet after all transactions contained within the block are applied to the balance sheet. In the preferred embodiment of the VeriBlock blockchain, the balance sheet is stored as a radix tree, and the hash is recomputed after each entry into the tree. |
| 508 | Often the largest field in a block, the transaction list contains all transactions which are included in the block, thus adding the transactions to the blockchain if the enclosing block is added to the blockchain. |
| 509 | The six fields 501, 502, 503, 504, 505, and 506 are serialized (see FIG. 6) to create a 64-byte header. The 64-byte header is designed to be small enough to fit inside an 80-byte OP_RETURN field while leaving enough space for 16 bytes of data to identify a Proof-of-Proof Miner. |

FIG. 6

| | |
|---|---|
| 601 | 6 fields, totaling 64 bytes, of data which comprise a block header of a subordinate blockchain block. |
| 602 | The Proof-of-Proof Miner generates a unique address to receive compensation for performing Proof-of-Proof Mining |
| 603 | The six block header fields are serialized in order: block version, previous block hash, merkle root hash, timestamp, bits target, and nonce (64 bytes), to which another 16 bytes (which represent a portion of the PoP Miner's address) are concatenated. This total 80 bytes of serialized data is what the POP Miner will publish to the Master Blockchain. |

-continued

Component List for Drawings

Figure 8:
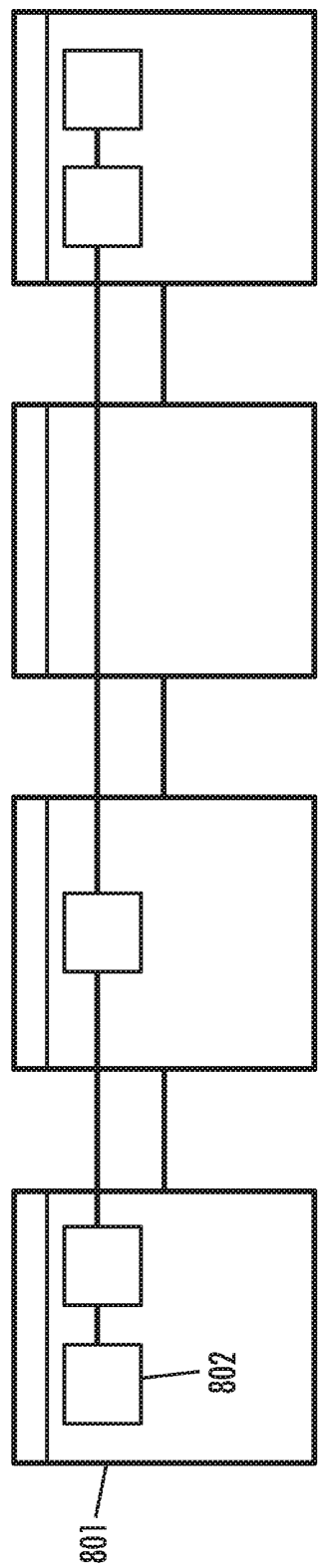
FIG. 8 illustrates a subordinate blockchain which stores the block headers of the master blockchain, so that the master blockchain's consensus can be maintained and viewed from the subordinate blockchain, and so that any demonstration of publication of subordinate blockchain state data to the master blockchain can be validated.
Figure 9:
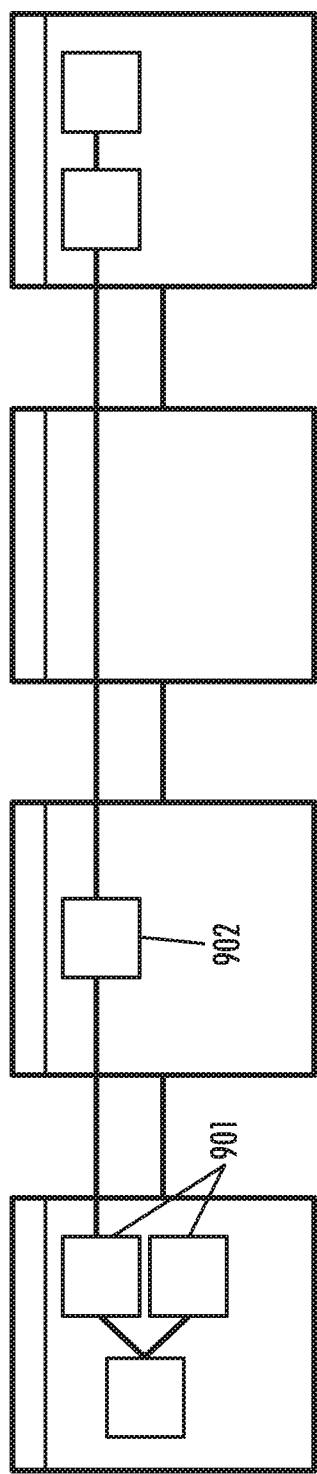
FIG. 9 illustrates a subordinate blockchain which stores the block headers of the master blockchain like in FIG. 4 and additionally illustrates the storage of a master blockchain fork (the master blockchain block headers 901 compete with each other, as both claim to be children of a common parent master blockchain block). In this illustration, only one of those competing blocks is built upon by the master blockchain, allowing the subordinate blockchain to maintain consensus of the master blockchain by receiving additional master blockchain block header(s) 52.
Figure 11:
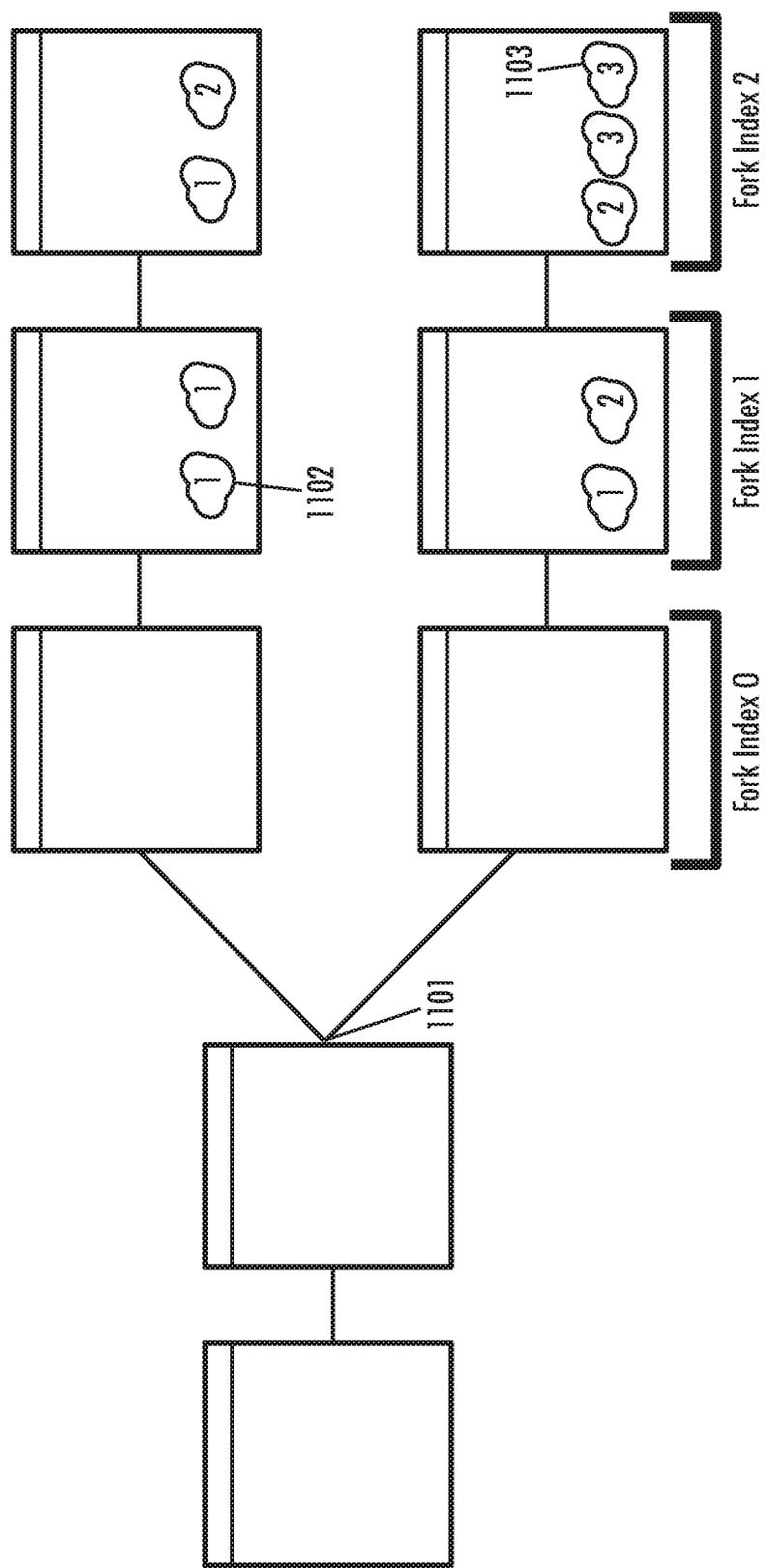
FIG. 11 illustrates fork resolution on a subordinate blockchain, wherein the proof-of-proofs point to the subordinate blockchain block for which they published blockchain state data. Depending on the weighting system used, either of the two potential forks forking from the common parent 1101 could be valid. In the instance that the suggested weighting algorithm is used, the top fork is taken, because of the timeliness of the proof-of-proof publications despite there being fewer total publications endorsing the top fork.

| Component Number | Component Description |
|---|---|
| | FIG. 7 |
| 701 | A master blockchain block header, which contains some valid, high-difficulty (low target) PoW solution. |
| 702 | A subordinate blockchain block header, which contains some valid PoW or PoS or other form of consensus solution. |
| 703 | The block header from the subordinate blockchain (along with miner identification data, which isn't shown in this figure) is published as a transaction into a master blockchain block's list of transactions |
| 704 | The proof that the subordinate blockchain block header was published to the master blockchain is constructed and published on the subordinate blockchain, making the subordinate blockchain aware of the presence of one of its previous block headers in the master blockchain. |
| 705 | The data published to the subordinate blockchain is, in at least one implementation, the merkle path from the master blockchain transaction in which the serialized subordinate blockchain header + miner identification is constructed, along with the necessary master blockchain block headers to provide SPV-level validation of the master blockchain's cumulative difficulty/PoW to the subordinate blockchain, along with some other information including but not limited to the full PoP miner address. |
| | FIG. 8 |
| 801 | One of 4 displayed subordinate blockchain blocks |
| 802 | One of 5 displayed master blockchain headers embedded into the subordinate blockchain, enabling the subordinate blockchain to have SPV-level validation of the master blockchain's consensus |
| | FIG. 9 |
| 901 | Two competing master blockchain block headers, both of which have been published to the subordinate blockchain |
| 902 | This master blockchain block header only builds on one of the two competing master block headers shown in 901, and resolves the master blockchain fork. |
| | FIG. 10 |
| 1001 | One of 4 displayed subordinate blockchain blocks |
| 1002 | One of 5 displayed master blockchain headers embedded into the subordinate blockchain, enabling the subordinate blockchain to have SPV-level validation of the master blockchain's consensus An embedded Proof-of-Proof |
| 1003 | publication which demonstrates the publication of a subordinate blockchain block header to the master blockchain by referencing one of the embedded master blockchain blocks 1002 |
| 1004 | An embedded Proof-of-Proof publication similar to 1003 which references a master blockchain block header published in a previous subordinate blockchain block |
| | FIG. 11 |
| 1101 | A fork in the subordinate blockchain occurred because two valid subordinate blockchain blocks both claimed the same subordinate blockchain block as a parent. |
| 1102 | A Proof-of-Proof publication like 1003, the number '1' represents that the publication maps to the first master blockchain block header considered for the purposes of fork resolution. The block header of the subordinate block it points to is the subordinate block that it endorses. |
| 1103 | A Proof-of-Proof publication like 1003, the number '3' represents that the publication maps to the third master blockchain block header considered for the purposes of fork resolution. The block header of the subordinate block it points to is the subordinate block that it endorses. |

The invention claimed is:

1. A method of improving the reliability of a subordinate blockchain, wherein the blockchain state data from the subordinate blockchain is proofed by a master blockchain, the method comprising:

receiving, by one or more nodes of the subordinate blockchain, at least one consensus proof of the subordinate blockchain, the at least one consensus proof demonstrating that the network of the subordinate blockchain has reached consensus on legitimacy of a subordinate blockchain block that has been recorded on the subordinate blockchain based on a consensus mechanism of the subordinate blockchain;

publishing, the at least one consensus proof to a master blockchain, wherein the master blockchain uses a first consensus mechanism and the subordinate blockchain uses a second consensus mechanism that is different from the first consensus mechanism;

receiving from the master blockchain, by one or more nodes of the master blockchain, a verification of publication of the at least one consensus proof to the master blockchain including a unique identifier identifying at least one entry into the master blockchain and identifying at least one master blockchain block containing the entry;

receiving at least one cryptographic proof which demonstrates incorporation of the entry into the master blockchain block;

validating, by one or more nodes of the subordinate blockchain, the verification of publication of the data to the master blockchain; and recording a proof-of-publication to the subordinate blockchain by one or more nodes of the subordinate blockchain.

2. The method of claim 1, wherein the method further comprises receiving consideration in exchange for publishing the at least one consensus proof to the master blockchain.

3. The method of claim 1 or 2, wherein the method further comprises receiving consideration in exchange for recording a proof-of-publication to the subordinate blockchain.

4. The method of claim 1, wherein the first consensus mechanism and the second consensus mechanism use different consensus algorithms and wherein the entry is a transaction.

5. A computer system for improving the reliability of a subordinate blockchain, wherein the blockchain state data from the subordinate blockchain network is proofed by a master blockchain, the system comprising:

at least one hardware processor; and at least one memory operatively coupled to the at least one processor and storing computer executable instructions which, when executed by the at least one processor, cause the at least one processor to:

receive, by communicating with one or more nodes of the subordinate blockchain, at least one consensus proof of the subordinate blockchain, the at least one consensus proof demonstrating that the network of the subordinate blockchain has reached consensus on legitimacy of specific data a subordinate blockchain block that has been recorded on the subordinate blockchain based on a consensus mechanism of the subordinate blockchain;

publish, the at least one consensus proof of the subordinate blockchain to a master blockchain, wherein the master blockchain uses a first consensus mechanism and the subordinate blockchain uses a second consensus mechanism that is different from the first consensus mechanism;

receive from the master blockchain, a verification of publication of the data to the master blockchain including a unique identifier identifying at least one entry into the master blockchain and identifying at least one master blockchain block containing the entry;

receive at least one cryptographic proof which demonstrates incorporation of the entry into the master blockchain block;

validate, by one or more nodes of the subordinate blockchain, the verification of publication of the data to the master blockchain; and record a proof-of-publication to the subordinate blockchain by one or more nodes of the subordinate blockchain.

6. The system of claim 5, wherein the instructions further cause the at least one processor to award consideration to a user in exchange for publishing the at least one consensus proof to the master blockchain.

7. The method of claim 5 or 6, wherein the instructions further cause the at least one processor to receive consideration in exchange for recording a proof-of-publication to the subordinate blockchain.

8. The system of claim 5, wherein the first consensus mechanism and the second consensus mechanism use different consensus algorithms and wherein the entry is a transaction.

9. A method implemented on nodes of a blockchain for improving block chain fork resolution, the method comprising:

identifying blockchain forks on a subordinate blockchain;

mapping a number of competing subchains that result from the identified blockchain forks;

calculating a relative proof-of-proof score of pairs of competing subchains based on at least one proof of-publication related to at least one of the subchains proofed by a master blockchain;

recording the relative proof-of-proof score(s) and a reference to the competing subchains that resulted in the proof-of-proof score(s);

removing a subchain from the blockchain network if a competing subchain with a higher relative proof-of-proof score is found;

adding a subchain to the blockchain network if the subchain has a higher relative proof-of proof score than competing subchains.

10. The method of claim 9, wherein the proof-of-proof score of a competing subchain is a sum of the proof-of-publication scores of its component blocks.

11. The method of claim 10, wherein the proof-of-publication score of a component block of a subchain is a function of a quantity of proof-of-publications of the block in subsequent subchain blocks in the same subchain and a measure of the timeliness of the proof-of-publications of the block.

12. The method of claim 11, wherein the measure of timeliness of a component block is relative to a block of corresponding position of a competing subchain.

13. The method of claim 12, wherein the timeliness is ascertained from a base time that is the earlier time of publication to a master blockchain between the block and the corresponding block on the competing subchain such that the closer to the base time that a that the block's publication occurred, the greater a weight is given to the block for proof-of-publication scoring purposes.

14. A computer system for improving block chain fork resolution, the system comprising:

at least one hardware processor; and at least one memory operatively coupled to the at least one processor and storing computer executable instructions which, when executed by the at least one processor, cause the at least one processor to:

identify blockchain forks on a subordinate blockchain;

map a number of competing subchains that result from the identified blockchain forks;

calculate a relative proof-of-proof score of each competing subchain based on at least one proof of publication related to at least one of the subchains received from a master blockchain;

record the relative proof-of-proof score and a reference to the competing subchains that resulted in the proof-of-proof score;

remove a subchain from the blockchain network when a competing subchain with a higher relative proof-of-proof score is found;

add a subchain to the blockchain network when the subchain has a higher relative proof-of proof score than competing subchains.

15. The system of claim 14, wherein the proof-of-proof score of a competing subchain is a sum of the proof-of-publication scores of its component blocks.

16. The system of claim 15, wherein the proof-of-publication score of a component block of a subchain is a function of a quantity of proof-of-publications of the block in subsequent subchain blocks in the same subchain and a measure of the timeliness of the proof-of-publications of the block.

17. The system of claim 16, wherein the measure of timeliness of a component block is relative to a block of corresponding position of a competing subchain.

18. The system of claim 17, wherein the timeliness is ascertained from a base time that is the earlier time of publication to a master blockchain between the block and the corresponding block on the competing subchain such that the closer to the base time that a that the block's publication occurred, the greater a weight is given to the block for proof-of-publication scoring purposes.

* * * * *